United States Patent [19]

Hart et al.

[11] Patent Number: 5,549,258

[45] Date of Patent: Aug. 27, 1996

[54] RETROFIT LUGGAGE BIN ASSEMBLY COMPATIBLE WITH EXISTING AIRCRAFT BIN SUPPORTS

[75] Inventors: Jack E. Hart, Bellevue; Ralph M. Burrows, Bellingham; Michael E. Marquardt, Seattle, all of Wash.

[73] Assignee: Heath Tecna Aerospace Company, Ardsley, N.Y.

[21] Appl. No.: 363,765

[22] Filed: Dec. 23, 1994

[51] Int. Cl.⁶ ........................................................ B64C 1/20
[52] U.S. Cl. ..................... 244/118.1; 244/118.5; 244/129.1; 312/246
[58] Field of Search ............................. 244/118.1, 118.2, 244/118.5, 119, 129.1; 312/101, 140, 242, 245, 246, 293; 248/121, 122, 200, 223.3; 108/42, 48

[56] References Cited

U.S. PATENT DOCUMENTS 4,799,631  1/1989  Humphries et al. .................. 244/118.5
5,108,048  4/1992  Chang ................................... 244/118.5
5,347,434  9/1994  Drake .................................... 244/118.5
5,383,628  1/1995  Harrichausen et al. ............. 244/118.5

FOREIGN PATENT DOCUMENTS

0614806A1  9/1994  European Pat. Off. .

Primary Examiner—Andres Kashnikow
Assistant Examiner—Tien Dinh
Attorney, Agent, or Firm—Christensen, O'Connor, Johnson & Kindness PLLC

[57] ABSTRACT

The invention provides luggage bin assemblies, for retrofitting existing aircraft with larger overhead storage bins, that is compatible with existing aircraft bin support structure for original equipment bins. The assemblies include both a bin structure and supporting brackets that engage the existing aircraft bin supports with little or no modification to the existing supports. This facilitates rapid retrofit of the aircraft thereby reducing aircraft out of service time and also costs of manpower used to retrofit the aircraft.

9 Claims, 6 Drawing Sheets

RETROFIT LUGGAGE BIN ASSEMBLY COMPATIBLE WITH EXISTING AIRCRAFT BIN SUPPORTS

FIELD OF THE INVENTION

The invention relates to overhead luggage bins used in aircraft for storing the carry-on luggage of passengers. More specifically, the invention provides a luggage bin assembly compatible with the existing bin support structure of aircraft to permit ready retrofitting of the aircraft with bins of larger volume and more modern design.

BACKGROUND OF THE INVENTION

Passenger aircraft, as originally equipped, include overhead bins for the storage of passenger carry-on luggage. Usually, these bins are located overhead on either side of the aisle, above the passenger seating space. In larger, wide-bodied aircraft, such as the Boeing 747, luggage bins are also provided above the central passenger seating space, in order to provide additional luggage storage capacity. Typically, passenger service units, air conditioning ducting, and emergency equipment for breathing are located in close proximity to the overhead bins.

In recent years, passengers have increasingly tended to travel with larger amounts of carry-on luggage, thereby placing a premium on available overhead luggage bin storage space. Because a large proportion of the world's existing aircraft fleet was built before this growing demand for carry-on luggage space, airlines using these aircraft find themselves in a less competitive position as compared to airlines using more modern aircraft that are equipped with larger original-equipment overhead bins. While airlines using these older aircraft have an identified need to upgrade and expand their carry-on luggage capacity to meet passenger demands, existing methods and retrofit assemblies for expanding carry-on luggage capacity are expensive, requiring lengthy aircraft out-of-service time. A standard type of aircraft retrofit would therefore significantly impact the costs and revenues of airlines, which frequently are already faced with thin profit margins due to intense competition in the industry.

Airlines that have aircraft with limited overhead storage space require an overhead luggage bin retrofit assembly that is rapid to install, thereby reducing aircraft out-of-service time and manpower costs; requires minimal, if any, modification to the existing aircraft bin support structure to support larger replacement luggage bins; and that meets all applicable regulatory safety requirements.

SUMMARY OF THE INVENTION

The invention provides an aircraft overhead luggage bin retrofit assembly that is compatible with existing bin support structures in an aircraft cabin. Further, the aircraft retrofit assembly of the invention provides ease of installation so that the downtime for retrofitting an aircraft with larger replacement overhead bins on the left and right sides of the cabin is significantly reduced.

Advantageously, the replacement overhead bins are usually larger than the original equipment bins and have large bin doors for ease of storing and removal of luggage. Moreover, the bins preferably have rearwardly sloping bases so that the risk of luggage spilling from the bins when they are opened after flight, as a result of luggage movement during flight, is significantly reduced.

The aircraft luggage bin retrofit assembly of the invention includes a mounting assembly for the luggage bin that is designed to be compatible with the existing support structure for the original equipment bins in the aircraft. For such compatibility, the existing original equipment bin support structure of the aircraft must include existing upper support brackets attached to the aircraft frame and extending transversely in an inboard direction. Existing continuous rails are attached to inboard ends of these upper support brackets to sustain forward and aft loading. Directly beneath the upper support brackets are lower support brackets, also attached to the aircraft frames and extending inboard. Both the upper and lower support brackets described are found, for example in Boeing 747 aircraft, and they are typically spaced 40 inches apart along the sides of the passenger cabin. Usually a larger bin retrofit operation requires removal of these supports and replacing them with new supports. This is the biggest of the individual tasks required in current retrofits. Consequently, the invention, which retains these existing supports, provides large installation time savings and significantly reduces costs.

In one embodiment, the replacement luggage bin has a mounting assembly, mechanically attached to the bin, that is designed for fixed mechanical attachment to the bin support structure for the original equipment bin. The mounting assembly includes an upper bin end support bracket, mechanically attached near the upper rear portions of bulkheads on either end of the replacement bin. These upper bin end support brackets extend rearward of the bin, and have end portions furthest from the bin that are adapted for mechanical attachment to a rail cooperating bracket, that is part of the retrofit assembly, and that is adapted for mechanical attachment to a rail which extends along the length of the aircraft cabin. This rail, which may be an already existing rail, or a replacement reinforced rail, is in turn supported and mechanically attached to the existing upper support brackets of the aircraft, that were used for supporting the original bin. The mounting assembly also includes a lower bin end support bracket, mechanically attached to the bin at each bulkhead at the ends of the bin, near a base portion of the bin. A portion of the lower bin end support bracket extends rearwardly from the bin and is adapted for mechanical attachment to a vertical bracket, which also forms part of the mounting assembly of the invention. The vertical bracket, adapted for being mounted in a substantially vertical orientation, has an upper end adapted for mechanical attachment to the existing upper support bracket, and a mid portion adapted for mechanical attachment to the existing lower support bracket. Further, a lower end of the vertical support bracket is adapted for mechanical attachment to the rearward extending portion of the lower bin end support bracket.

Depending upon the size and capacity of the replacement bins, the mounting assembly, described above, may not be adequate for support. Consequently, in addition to the bin upper and lower end support brackets, intermediate upper and lower support brackets may also be used, in conjunction with intermediate bin bulkheads, rail cooperating brackets and vertical support brackets. Generally, intermediate bulkheads are located in the replacement bins at spacings that accommodate the existing support bracket spacings, usually multiples of 40 inches, typically spacings of either 40, 80 or 120 inches. These spacings correspond with the spacings between the existing upper support brackets and the spacings between existing lower support brackets, designed to support the original bins. An intermediate upper support bracket is mechanically attached to the bin at a juncture coincident with an intermediate bulkhead of the bin, so that the support bracket is securely fastened. The upper support bracket extends upward and rearward from the bin for attachment to a rail cooperating bracket, which is attached to the rail that extends along the length of the aircraft cabin. Likewise, the base portion of the bin is supported by intermediate lower support brackets, mechanically attached to lower portions of the bin at junctures coincident with intermediate bulkheads of the bin. The lower support brackets extend rearward of the bin for attachment to a vertical support bracket, which forms part of the retrofit mounting assembly.

An alternate embodiment of the invention may be used when the capacity of the retrofit luggage bins permits the stowage of a mass of luggage which does not require as much support structure as in the embodiment described above. In this instance, the retrofit bin is adapted for mechanical attachment, at a point on the upper portion of the rear of the bin, to the rail and existing upper support brackets. An extension bracket projecting from inboard end portions of the existing lower support brackets has a nose portion angled for supporting the rear side of the replacement luggage bin, and is mechanically attached to the rear of the luggage bin to provide further support.

In a further alternate embodiment, the one-piece vertical bracket may be replaced by two generally elongate brackets. The first of these two brackets having an upper end adapted for mechanical attachment to the existing upper support bracket, a mid portion adapted for attachment to the existing lower support bracket, and a lower end portion adapted for mechanical attachment thereto of the air conditioning ducts that support the outboard ends of the passenger service units. The second of these generally elongate brackets has one end adapted for attachment to the existing lower support bracket, and another end adapted for mechanical attachment to the rearwardly extending portions of the lower bin support brackets, and the intermediate lower support brackets.

As a result of the retrofit of the invention, passenger service units and air conditioning ducts must be relocated. According to the invention, an outboard end of the passenger service unit is mounted to an existing supporting rail extension on the air conditioning duct and an inboard end thereof is mounted on a rail integral with and extending along the rear base of the retrofit bin. The air conditioning duct, and hence the outboard passenger service unit supports, are held in place by a vertical bracket that has one end adapted for attachment to the air conditioning duct, a mid portion for attachment to the existing lower support bracket of the aircraft, and an upper end adapted for fixed attachment to the existing upper support bracket of the aircraft.

The aircraft overhead luggage bin retrofit assembly of the invention provides the increased overhead luggage bin capacity needed to meet the carry-on luggage requirements of modern day air travel passengers while at the same time significantly reducing the cost of retrofitting existing aircraft.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, all of which are schematic and not to scale, wherein.

DETAILED DESCRIPTION OF THE PREFERRED EMBODIMENTS

The invention provides several embodiments of an aircraft overhead luggage and retrofit assembly that is compatible with existing bin support structure in a Boeing 747 aircraft cabin and other aircraft using similar support structure. The accompanying schematic drawings illustrate certain embodiments of the invention, but the invention is not limited to these embodiments. However, for ease of explanation, reference may be had to the figures in order to better understand certain features of the invention.

Figure 1:
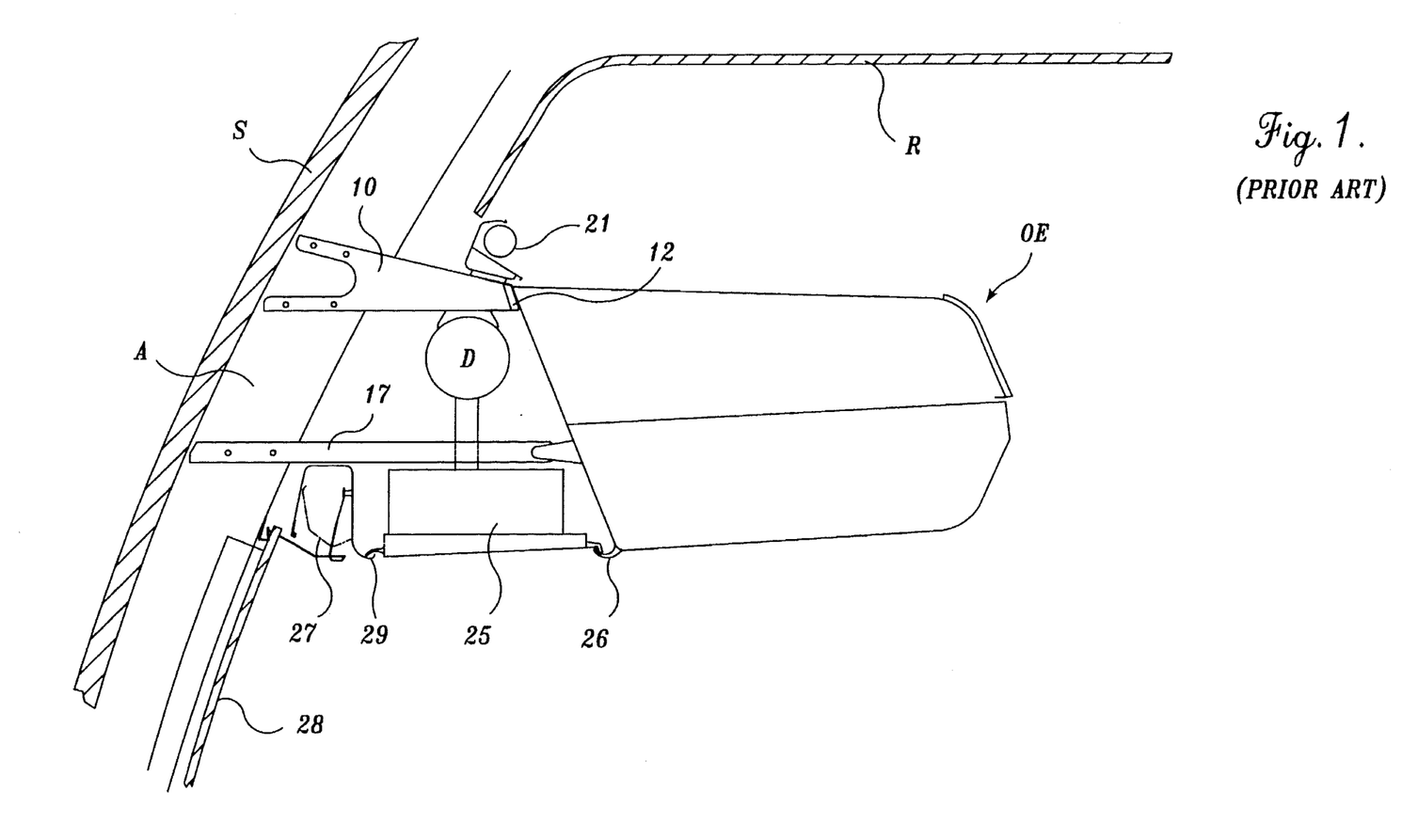
FIG. 1 is a schematic end view showing the existing aircraft luggage bin support structure and an original equipment luggage bin in place.

As a preliminary matter, it should be noted that an existing aircraft frame includes a structure that is specifically designed to support the original equipment overhead luggage bins. Typically, as shown in FIG. 1, the aircraft includes an outer skin S, of generally cylindrical shape, surrounding an interior space of the aircraft. The skin S is held in place and supported structurally by an aircraft frame A. Support brackets for the overhead bin assembly are then fixedly attached to the aircraft frame A. Thus, a series of upper support brackets 10 are each fixedly attached at one end to aircraft frame A, and extend generally transversely into the interior space of the aircraft so that their farthest, or inboard, ends have bullnoses that are attached to a rail 12 that extends laterally along the length of the aircraft. Further, an existing overhead bin support structure also includes a series of second, or lower, support brackets 17 positioned below upper support brackets 10 and also extending from a fixed attachment to the aircraft frame A, into the interior of the aircraft so that the farthest extending ends thereof, the inboard ends, support a rear side of an original equipment overhead luggage bin OE. Typically, the interior sides of the cabin are covered with side wall panels 28 and the interior ceiling R of the aircraft extends from behind and above the original equipment bin, as shown, so that lighting 21 may be located between the ceiling R and the upper surface of the bin. Further, a passenger service unit 25 is usually mounted on a rail on the lower rear edge of bin OE so that its undersurface is generally coextensive with the underside of the bin OE and extends towards the air conditioning duct 27 for supportive attachment thereto. Cold air duct D supplies air to the passenger service unit 25.

In the specification and claims, the term "mechanical attachment" encompasses those methods used and approved in the aircraft industry, including, but not limited to, attachment by nuts and bolts, rivets, screws, threaded bolts into threaded inserts, and adhesive bonding.

In order to install the retrofit luggage bin assembly of the invention in a Boeing 747 aircraft or like aircraft having original bin support structure described above, the original equipment bin OE is first dismantled from the aircraft luggage bin support structure described above, and removed. Thereafter, in accordance with the invention, the retrofit luggage bin B with mounting assembly, that is compatible with the existing aircraft bin support structure, is installed.

Figure 2A:
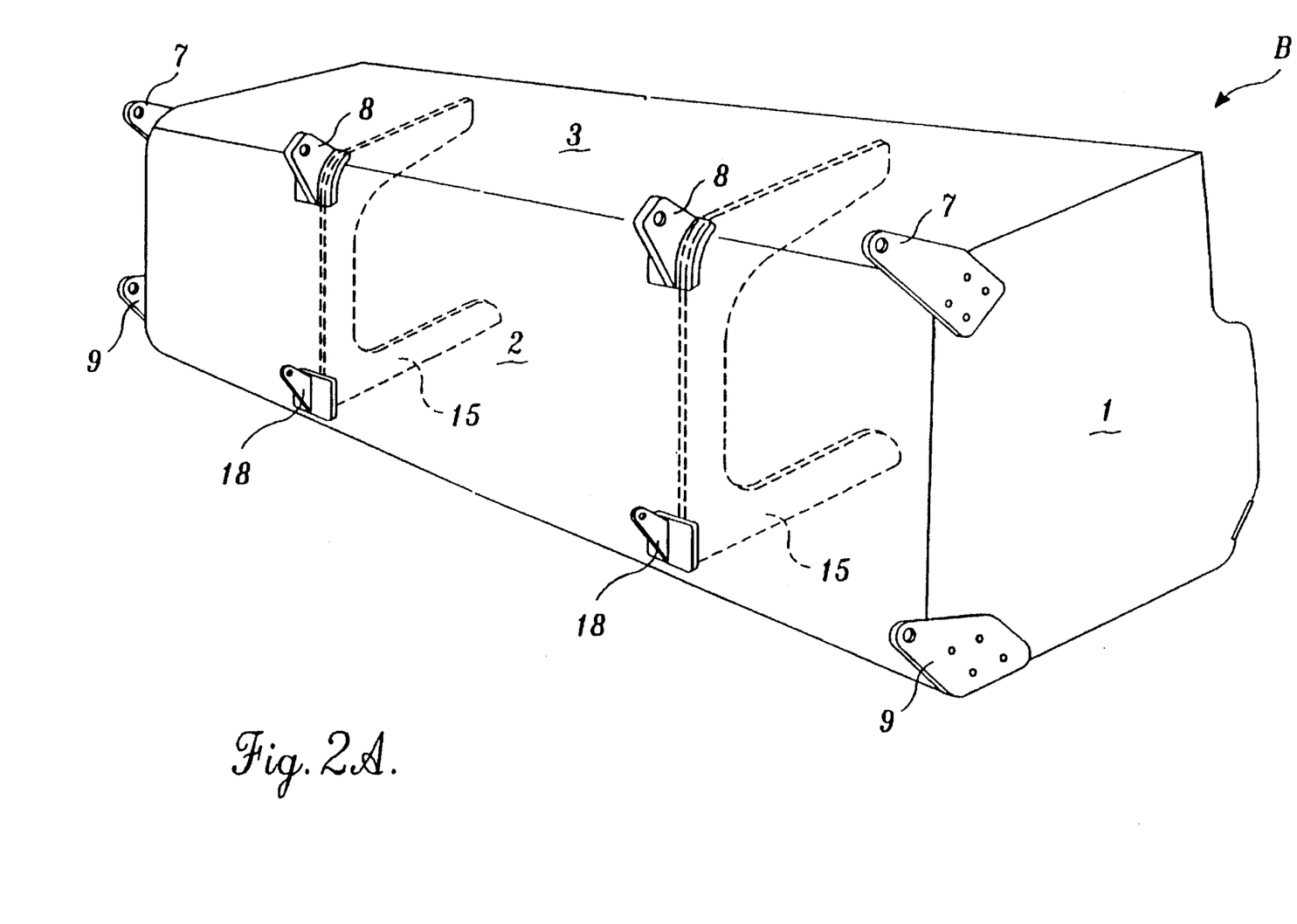
FIG. 2A is a perspective view, showing the rear and parts of the mounting assembly for a retrofit luggage bin assembly according to the invention.
Figure 2B:
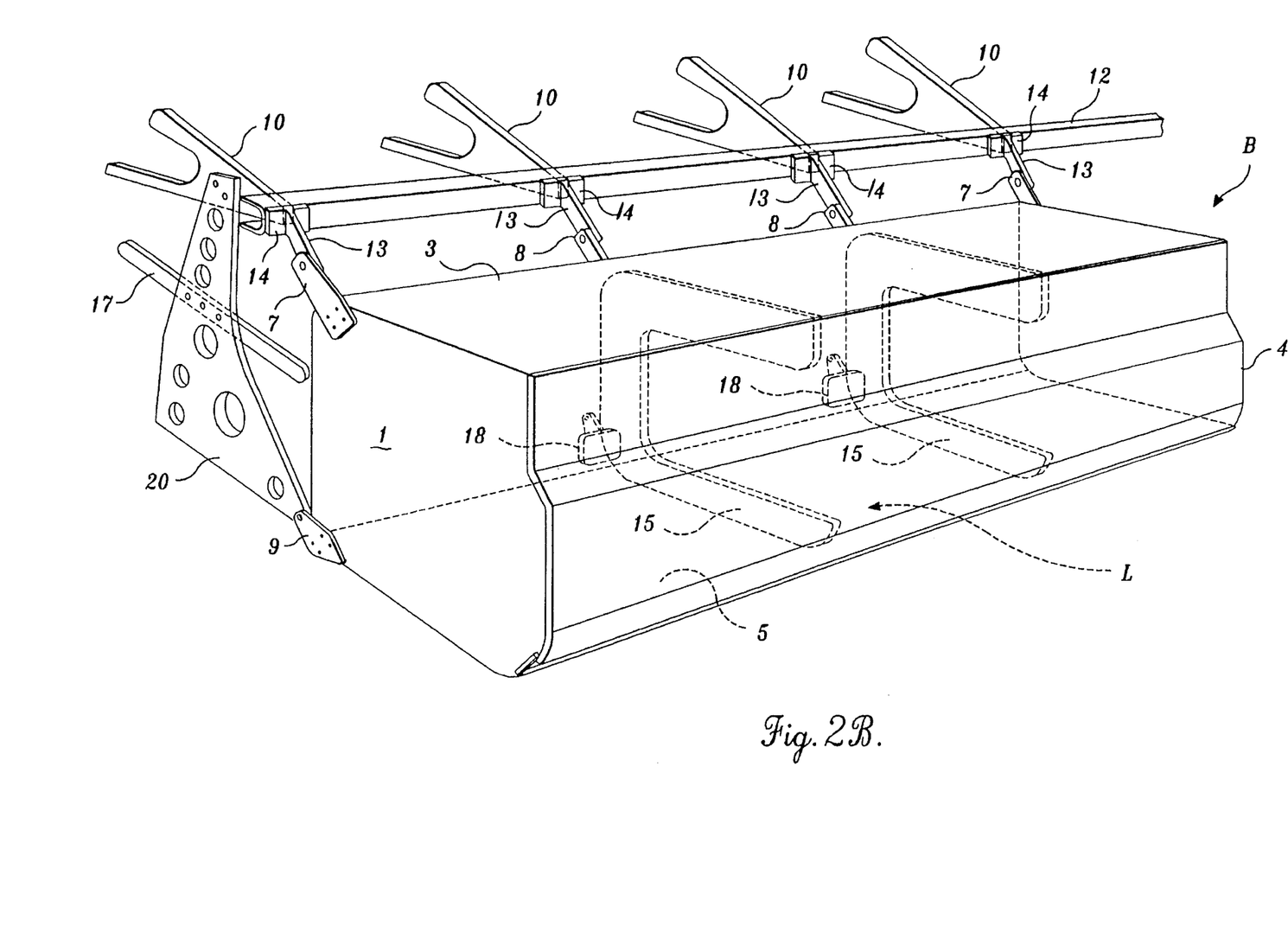
FIG. 2B is a perspective view showing a side and front of a retrofit luggage bin assembly as installed, according to one embodiment of the invention.

Referring to FIGS. 2A and B, an embodiment of a retrofit luggage bin B has end bulkheads 1, a rear side 2, a top side 3, and a base or underside 5. Further, referring to FIG. 2C, a front side of the bin B is equipped with a door 4 with hinge 23 and latch 24 for closing the door 4. The base 5 slopes gently downward away from the door 4 so that luggage placed within the storage space L will have a tendency to lean against the rear side 2, and a reduced tendency to spill from the front of the bin, when door 4 is opened.

Luggage bin B is equipped with a unique mounting assembly that includes several support brackets, which are compatible with, and which cooperate with, existing bin support structure of a Boeing 747 aircraft. Thus, upper end support brackets 7 mechanically attach to and extend from the upper rear of bin B, preferably one on each bulkhead 1, and upper intermediate brackets 8 are mechanically attached to the bin B at intervals described above, depending upon bin size and the mass of luggage it is expected to support when in use. Thus, larger bins carrying heavier loads would have upper intermediate brackets 8 mechanically attached at intermediate bulkheads 15 that are spaced shorter distances apart to provide support, for example, 40 inches. Smaller bins, carrying lighter loads, on the other hand, would have upper intermediate brackets 8 at longer spacings, for example, 80 inches. An upper bin support bracket 7, mechanically affixed to a bulkhead 1 of bin B, for example by a series of fasteners 6, extends rearward of the bin B to terminate in an end which is adapted to mechanically cooperate with tongue 13, of a rail cooperating bracket 14, shown as an angled bracket 14 having a tongue 13, for mechanically fixed attachment thereto. Rail cooperating bracket 14 in turn is mechanically attached to a rail 12, that may be the existing rail that extends between upper support brackets 10, or a reinforced replacement rail, depending upon the size and capacity of bin B.

Intermediate upper bin support brackets 8 extend rearward from the bin B and are adapted for mechanical attachment to angled brackets 14, which are in turn mechanically attached to the rail 12. Thus, the upper section of the bin B is supported from upper bin end support brackets 7, as well as intermediate upper bin support brackets 8, in the case of the larger bins. Preferably, the rail cooperating brackets 14 are mechanically attached to the rail 12 at points coincident with the rail's attachment to support brackets 10, as shown in FIG. 2B. Depending upon bin loading however, the bin attachment may also be made on the rail 12 in between the existing upper support brackets 10.

Figure 2C:
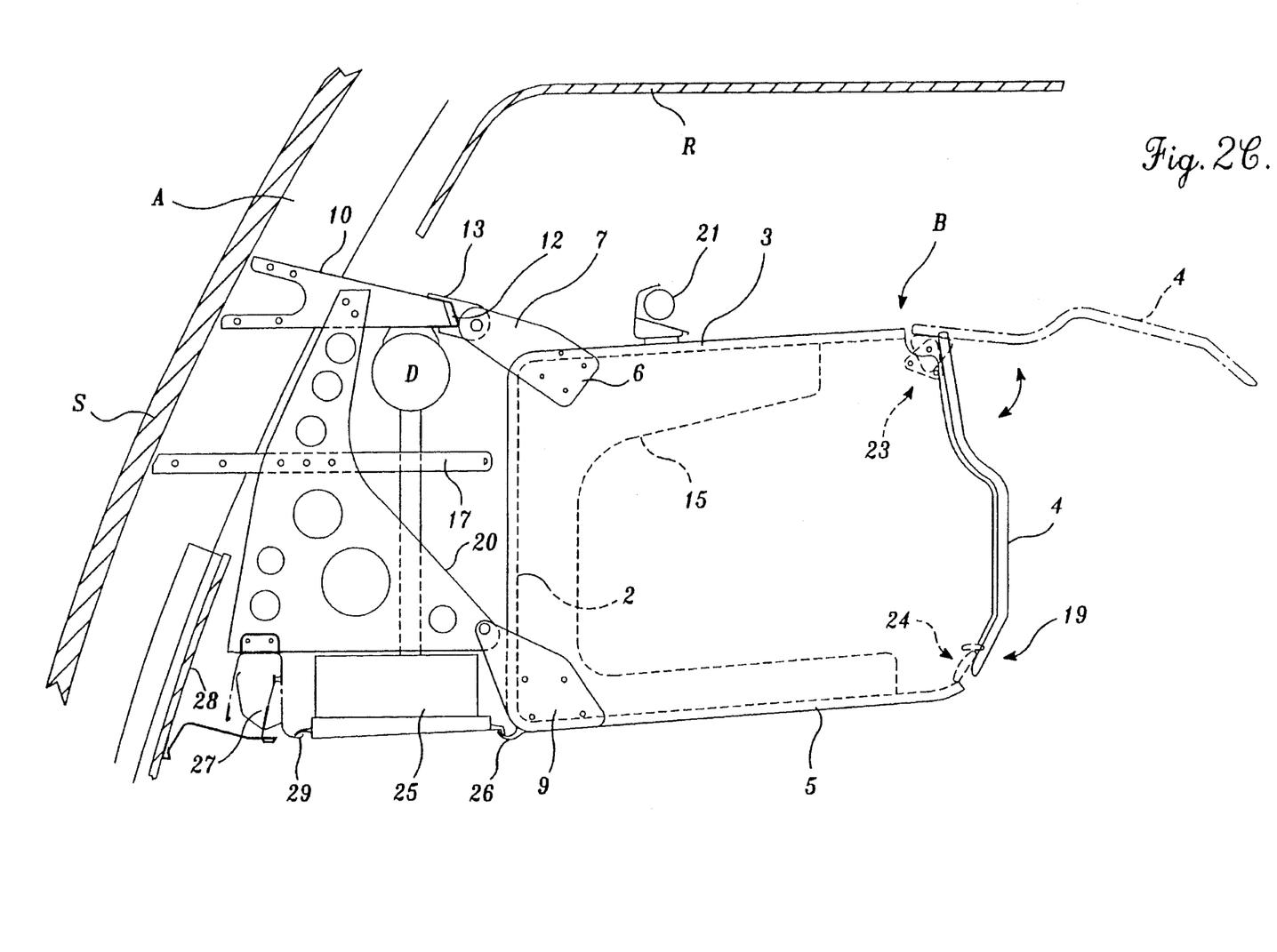
FIG. 2C is a schematic of an end view of an embodiment of a retrofit luggage bin assembly, as mounted on existing bin support structure according to the invention.

The bin also has lower end stabilizing brackets 9 which are mechanically affixed to the rear side 2 or bulkhead 1 of the bin B, as shown in FIG. 2A, and which extend and project rearwardly from the bin B. The end stabilizing brackets 9 extend up to new vertical support brackets 20 and are mechanically affixed to 20, as shown in FIG. 2C. Moreover, lower intermediate support brackets 18 are spaced at intervals and coincident with intermediate bin bulkheads 15, as shown, to provide support. The spacings between intermediate bin bulkheads 15 are determined by the bin size and capacity considerations, as described above. The lower intermediate brackets 18 extend rearward of the bin and are adapted for mechanical attachment to vertical brackets 20, in substantially the same manner as end stabilizing brackets 9.

As a result of installation of the retrofit luggage bin assembly, the passenger service units 25 and air conditioning ducts 27 must be relocated. Thus, the inboard end of the passenger service unit 25 is mounted on a rail 26 extended onto and along the lower end of rear side 2 of luggage bin B. The outboard edge of the passenger service unit 25 is mounted on existing rail 29 on the inboard edge of air conditioning duct 27, which is supported by attachment to new vertical support bracket 20. This vertical bracket 20 is in turn fixedly mechanically attached to existing lower support bracket 17 and existing upper support bracket 10, as shown.

Figure 3:
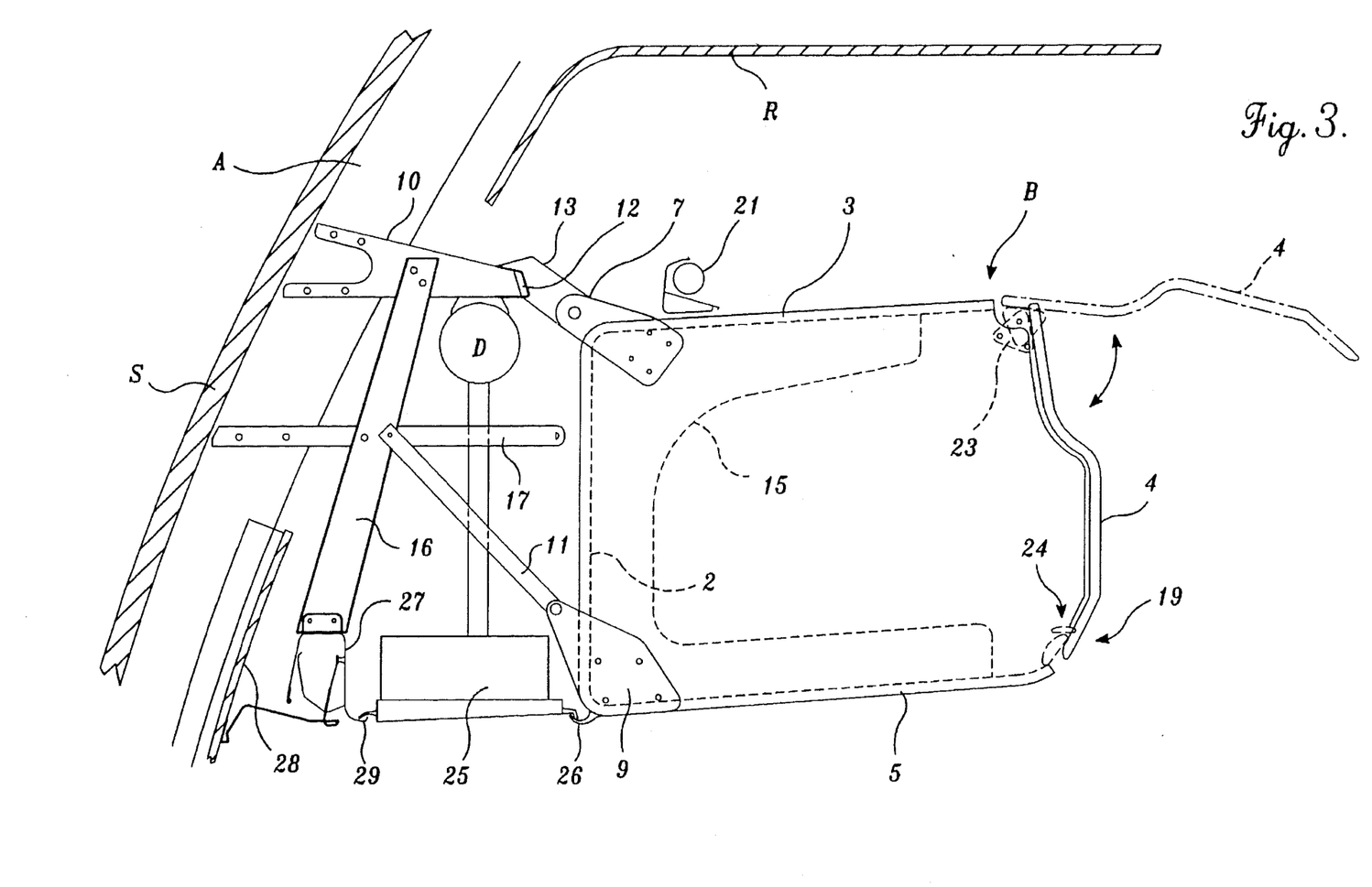
FIG. 3 is a schematic end view of an alternate embodiment of a retrofit luggage bin and mounting assembly according to the invention.

With reference to FIG. 3, an alternative embodiment, the single vertical bracket 20 of the mounting assembly is replaced with two brackets: an elongate vertical support bracket 16 and a transverse bracket 11. Thus, bracket 16 has an upper end adapted for fixed attachment to existing upper support bracket 10, a mid portion for attachment to existing lower support bracket 17 and a lower end adapted for mechanical attachment to air conditioning duct 27 for supporting the passenger service unit and duct. Bracket 11 is adapted for mechanical attachment of one end to existing lower support bracket 17 and the other end to a rearward extending portion of lower support bracket 9 or intermediate lower support brackets 18 for further bin support between bin ends 1.

Figure 4:
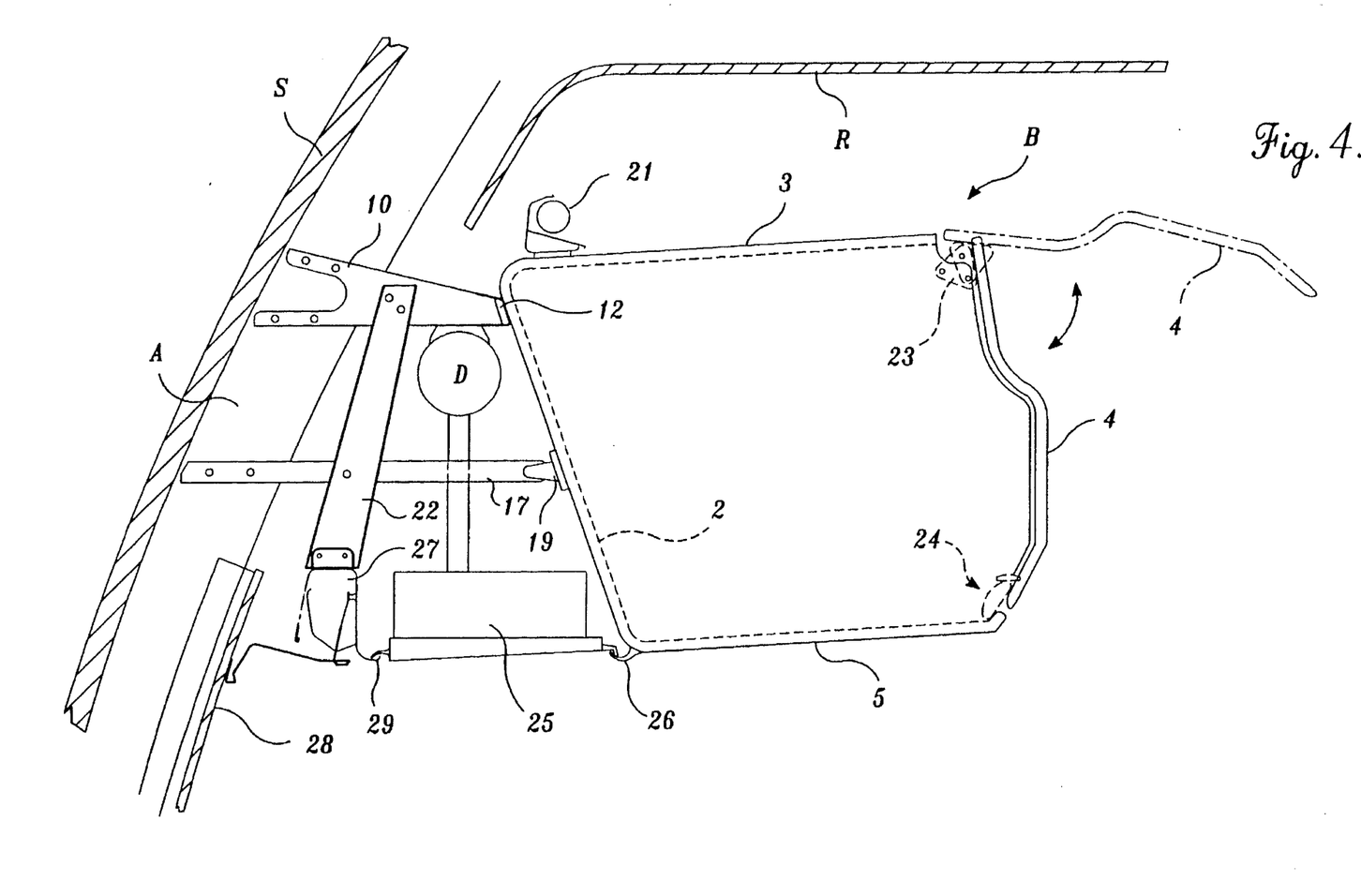
FIG. 4 is a schematic end view of an alternate embodiment of a retrofit luggage bin and bunting assembly according to the invention.

With reference to FIG. 4, in this alternative embodiment of a retrofit luggage bin and mounting assembly, according to the invention, fewer support brackets are needed to hold the bin B in place. This embodiment is most suited for smaller bins B of lower capacity that require less support. Thus, in this embodiment, rail 12 is mechanically attached to a rear portion of bin B, preferably directly. An angled extension support piece 19 is attached to the inboard end of existing lower support bracket 17 and extends so that a flat flange of the nose portion of the support piece 19 abuts against and is mechanically fastened to the rear side 2 of bin B. Passenger service unit 25 is relocated as shown. Air conditioning duct 27 supports the outboard edge of passenger service unit 25 and is in turn supported by mechanical attachment to an end of a new substantially vertical elongate support bracket 22. Bracket 22 is adapted to be anchored, by mechanical attachment, to existing lower support bracket 17 at about its mid point and to upper support bracket 10 at its upper end. Thus, this simplified embodiment eliminates the need for stabilizing brackets 9 and lower intermediate support brackets 18.

Since this embodiment of the retrofit luggage bin assembly of the invention requires a less complex mounting assembly, it is expected that this retrofit assembly would be easier and less time-consuming to install, thereby allowing greater cost savings.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. An aircraft overhead luggage bin retrofit assembly compatible with existing bin support structure in an aircraft cabin, said support structure including upper support brackets and lower support brackets mechanically attached to the aircraft frame and extending transversely from sides of the aircraft into the cabin, the retrofit assembly comprising:

(a) a replacement luggage bin comprising a bulkhead at each end thereof; a base, a top, and a rear side, each extending coextensively between the bulkheads to produce a containment space for receiving luggage; and a cabin-facing side opposite the rear side, said cabin-facing side equipped with a door to allow sealing of the containment space; and (b) a mounting assembly for fixedly connecting the replacement luggage bin to the existing bin support structure, the mounting assembly comprising:

(i) an upper bin support bracket mechanically attached to an upper rear portion of the replacement bin, the upper bin support bracket extending from the rear of the bin and having an end portion, furthest from the bin, for mechanical attachment to a rail cooperating bracket mechanically attached to a rail extending along a length of the aircraft cabin, the rail supported by the existing upper support brackets of the aircraft;

(ii) a lower bin support bracket mechanically attached to the bin near a base portion of the rear of the bin, a portion of the lower bin support bracket extending rearwardly from the bin for mechanical attachment to a vertical bracket; and (iii) a vertical bracket adapted for mechanical attachment at an upper end thereof to existing upper support brackets, and mechanical attachment of a mid portion thereof to existing lower support brackets, and mechanical attachment to the rearward extending portion of the lower bin support bracket.

2. The retrofit assembly of claim 1, further comprising at least one intermediate upper bin support bracket mechanically attached to the bin at a juncture coincident with intermediate bulkheads of the bin, said at least one upper bin support bracket extending rearward from the bin for attachment to a second bracket.

3. The retrofit assembly of claim 1, wherein the second bracket, attached to a rail extending along a length of the aircraft cabin, is aligned with a bullnose of an existing upper support bracket of the aircraft.

4. The retrofit assembly of claim 1, further comprising at least one intermediate lower bin support bracket mechanically attached to a lower portion of the bin at a juncture coincident with intermediate bulkheads of the bin, the lower bin support brackets extending rearwardly of the bin for attachment to a vertical support bracket.

5. The retrofit assembly of claim 1, wherein the base of the luggage bin is rearwardly inclined at an angle when the bin is installed, whereby any risk of luggage pressing against the door and spilling from the containment space when the door is opened, is reduced.

6. An aircraft overhead luggage bin retrofit assembly compatible with existing bin support structure in an aircraft cabin, said support structure including upper support brackets and lower support brackets mechanically attached to the aircraft frame and extending transversely from sides of the aircraft into the cabin, the retrofit assembly comprising:

(a) a replacement luggage bin comprising end bulkheads at each end thereof, a base, a top, and a rear side, each extending coextensively between the end bulkheads to produce a containment space for receiving luggage; and a cabin-facing side opposite the rear side, said cabin-facing side equipped with a door to allow sealing of the containment space; and (b) a mounting assembly for fixedly connecting the replacement luggage bin to existing bin support structure, the mounting assembly comprising:

(i) a mechanical attachment point on the upper portion of the rear of the bin for mechanical attachment of the bin to a rail extending between existing upper support brackets, said upper support brackets connected to an existing aircraft frame and adapted for supporting an original bin; and (ii) an extension bracket, adapted for mechanical attachment to an inboard projecting end portion of an existing lower support bracket, the extension bracket having a nose portion angled for supporting the rear side of the replacement luggage bin, said nose adapted for mechanical attachment to the rear side of the bin.

7. An aircraft overhead luggage bin retrofit assembly compatible with existing bin support structure in an aircraft cabin, said support structure including upper support brackets and lower support brackets mechanically attached to the aircraft frame and extending transversely from sides of the aircraft into the cabin, the retrofit assembly comprising:

(a) a replacement luggage bin comprising a bulkhead at each end thereof; a base, a top, and a rear side, each extending coextensively between the bulkheads to produce a containment space for receiving luggage; and a cabin-facing side opposite the rear side, said cabin-facing side equipped with a door to allow sealing of the containment space; and (b) a mounting assembly, mechanically attached to the bin, for fixedly connecting the replacement luggage bin to the existing bin support structure of the aircraft frame, the mounting assembly comprising:

(i) an upper bin support bracket mechanically attached to an upper rear portion of the replacement bin, the upper bin support bracket extending from the rear of the bin and having an end portion, furthest from the bin, for mechanical attachment to a tongue of a rail cooperating bracket mechanically attached to a laterally extending rail, the rail supported by the existing upper support brackets of the aircraft;

(ii) at least one intermediate upper bin support bracket, mechanically attached to the bin at a juncture coincident with intermediate bulkheads of the bin, said at least one upper bin support bracket extending rearward from the bin for attachment to a second bracket;

(iii) a lower bin support bracket mechanically attached to the bin near a base portion of the rear of the bin, a portion of the lower bin support bracket extending rearwardly from the bin for mechanical attachment to a vertical bracket;

(iv) at least one intermediate lower bin support bracket mechanically attached to a lower portion of the bin at a juncture coincident with intermediate bulkheads of the bin, the intermediate lower bin support brackets extending rearward of the bin for attachment to a vertical support bracket; and (v) at least one vertical support bracket adapted for mechanical attachment at an upper end thereof to existing upper support brackets, and mechanical attachment of a mid portion thereof to existing lower support brackets, and mechanical attachment of a lower portion thereof to the rearward extending portion of lower bin support brackets.

8. The retrofit assembly of claim 7, wherein the second bracket, attached to a rail extending along a length of the aircraft cabin, is aligned with a bullnose of an existing upper support bracket of the aircraft.

9. The retrofit assembly of claim 8, wherein the base of the luggage bin is rearwardly inclined at an angle when the bin is installed, whereby any risk of luggage pressing against the door and spilling from the containment space when the door is opened, is reduced.

* * * * *